US008204658B2

(12) United States Patent
Shoda et al.

(10) Patent No.: US 8,204,658 B2
(45) Date of Patent: Jun. 19, 2012

(54) AUTOMATIC TRANSMISSION CONTROL APPARATUS

(75) Inventors: Tomohisa Shoda, Chiyoda-ku (JP);
Shiro Yonezawa, Chiyoda-ku (JP);
Takeru Okabe, Chiyoda-ku (JP);
Osamu Ishikawa, Chiyoda-ku (JP);
Nozomu Kamioka, Chiyoda-ku (JP);
Masaki Horii, Chiyoda-ku (JP);
Yasufumi Ogawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/427,365

(22) Filed: Apr. 21, 2009

(65) Prior Publication Data

US 2010/0116074 A1 May 13, 2010

(30) Foreign Application Priority Data

Nov. 13, 2008 (JP) ................................. 2008-291157

(51) Int. Cl.
*G06F 7/00* (2006.01)

(52) U.S. Cl. ............ 701/53; 701/51; 477/54; 318/400.3

(58) Field of Classification Search .................... 701/51, 701/55; 477/54, 89, 181; 74/473.12; 318/400.3; 180/179
See application file for complete search history.

(56) References Cited

U.S. PATENT DOCUMENTS

| 4,506,752 A * | 3/1985 | Hara et al. .................... 180/179 |
| 2009/0265066 A1 * | 10/2009 | Ogawa et al. ................... 701/55 |

FOREIGN PATENT DOCUMENTS

| JP | 2003-214352 A | 7/2003 |
| JP | 2005-117756 A | 4/2005 |
| JP | 2007-282299 A | 10/2007 |

* cited by examiner

*Primary Examiner* — Gertrude Arthur Jeanglaude
(74) *Attorney, Agent, or Firm* — Sughrue Mion, PLLC

(57) ABSTRACT

An automatic transmission control apparatus secures the safe operation of a motor drive through the use of a voltage determination unit that determines which one of a voltage detected by a control apparatus voltage detection unit and a voltage detected by a motor voltage detection unit is to be utilized as a duty reference voltage. The motor control apparatus controls the motor, based on a motor drive duty that a drive duty calculation unit calculates by use of the voltage selected by the voltage determination unit.

9 Claims, 8 Drawing Sheets

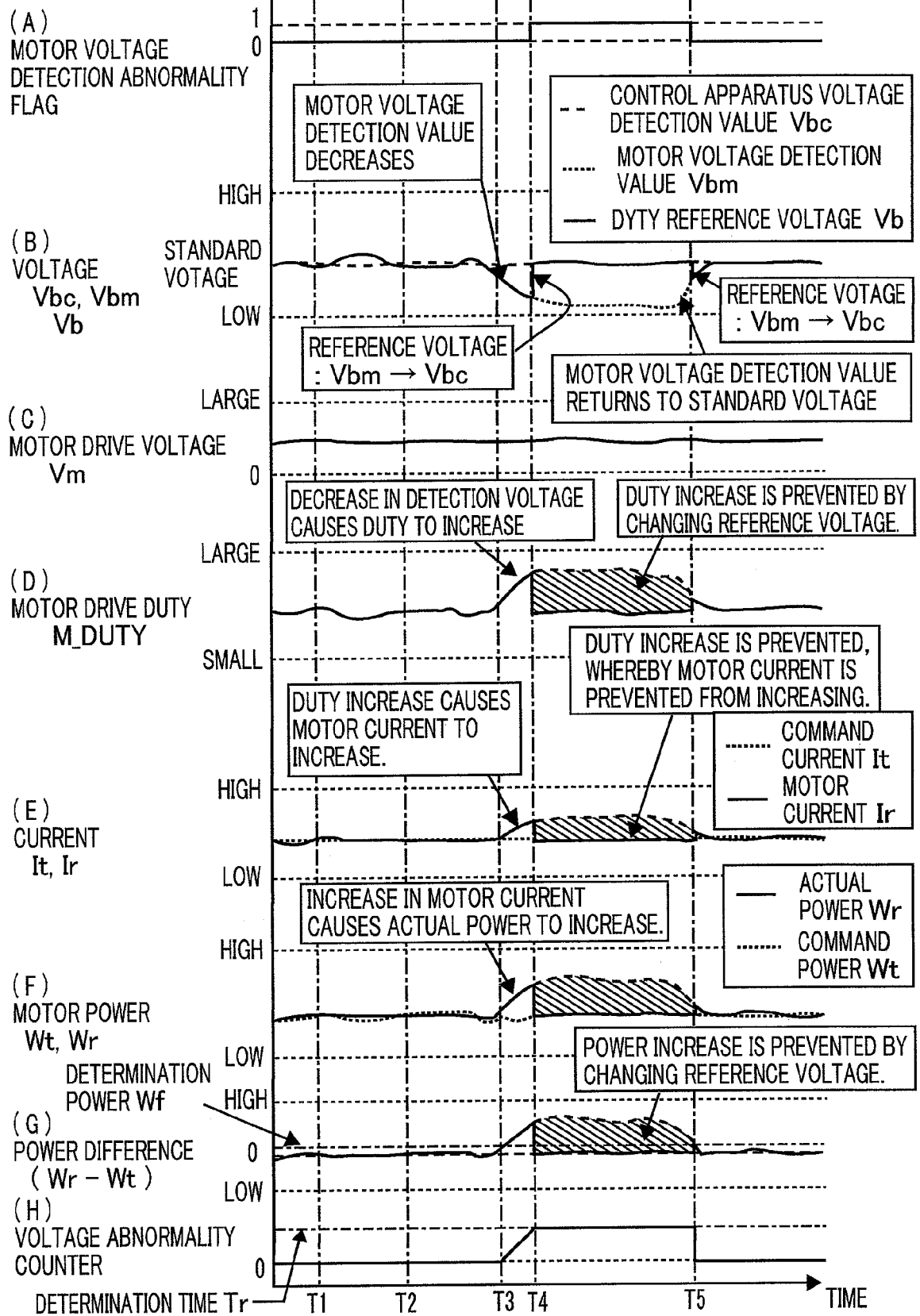

AUTOMATIC TRANSMISSION CONTROL APPARATUS

BACKGROUND OF THE INVENTION

1. Field of the Invention

The present invention relates to a control apparatus for controlling an automatic transmission, and more particularly to an automatic transmission control apparatus that changes transmission gear ratios by use of a motor.

2. Description of the Related Art

There is publicly known an automatic transmission that changes the gear ratios of a transmission mechanism by operating a transmission lever through a shift direction motor and a selection direction motor. Each of the shift direction motor and the selection direction motor that are utilized in such an automatic transmission may be, for example, a three-phase AC motor that is driven by a DC power source by way of an inverter.

To date, among apparatuses that drive a three-phase AC motor through an inverter, there has been known a motor control apparatus (e.g., refer to Japanese Patent Application Laid-Open No. 2005-117756) that has a voltage detection unit for detecting a DC voltage as an input voltage of an inverter and a motor current detection unit for detecting a motor current, that drives a motor while selecting one of PWM (Pulse-Width Modulation) control and rectangular wave control, that detects abnormality in the voltage detection unit, based on a detected amount of change in the DC voltage or in the motor current, and that, in the case where it is determined that an abnormality exists in the voltage detection unit, fixes the control of the motor to the PWM control.

In the motor control apparatus disclosed in Japanese Patent Application Laid-Open No. 2005-117756, in the case where the voltage detection unit fails, a DC voltage (input voltage of the inverter) outputted from the voltage detection unit is fixed to a minimum guaranteed voltage. The minimum guaranteed voltage is set in such a way as to be the minimum value among values of the input voltage of the inverter. The PWM control is performed as follows. Current feedback control is performed in accordance with a d-axis current command value based on a torque command and a current difference obtained from a d-axis current (motor current); a voltage command value is calculated based on the current feedback control; after a superposition voltage is added to the voltage command value, processing such as a coordinate transformation is performed so as to calculate three-phase voltage command values; the three-phase voltage command value is normalized with respect to the inverter input voltage, i.e., a duty ratio is calculated; and the inverter is PWM-controlled through a pulse width calculated based on the duty ratio so that a motor is operated.

However, in the conventional apparatus disclosed in Japanese Patent Application Laid-Open No. 2005-117756, by fixing the input voltage of the inverter to the minimum value in the case where the voltage detection unit fails, the duty ratio is increased. For example, in the case of a normal state, the duty ratio is calculated with respect to a normal inverter input voltage (e.g., 12 [V]); however, in contrast, in the case where the voltage detection unit fails during a control state in which the voltage command value becomes constant, the duty ratio is calculated with respect to the minimum inverter input voltage (e.g., 8 [V]), whereby the duty ratio increases.

In this situation, in the case where the inverter input voltage, which cannot be detected, is the same as the fixed value, even though the duty ratio increases, the voltage utilized for calculating the duty ratio is the same as the actual voltage; therefore, a voltage equal to the voltage command value can be applied to the motor. However, in the case where the actual inverter voltage is higher than a fixed value such as a normal-state voltage, the motor is operated with an increased duty ratio; therefore, a voltage higher than the voltage command value is applied to the motor. Accordingly, there has been a problem that torque greater than a torque command value is produced and a current greater than a current command value flows, whereby a motor cannot safely be operated. Additionally, there has been a problem that, in the case where torque greater than a torque command value is produced, a motor is erroneously operated, whereby the controllability of the motor operation is deteriorated.

SUMMARY OF THE INVENTION

The present invention has been implemented in order to solve the foregoing problems in a conventional apparatus; the objective thereof is to provide an automatic transmission control apparatus in which, even in the case where an abnormality occurs in a unit for detecting a supply voltage to a motor control apparatus, the duty ratio is suppressed from increasing and a voltage to be applied to a motor and torque to be produced are suppressed from increasing so that the safety in the motor operation is secured, the controllability of the motor drive is not deteriorated, and the transmission mechanism of the automatic transmission is not erroneously operated.

An automatic transmission control apparatus according to the present invention changes transmission gear ratios of a transmission mechanism by use of a motor and includes a motor control apparatus that receives a voltage from a DC power source and controls the motor; a motor voltage detection unit that detects the voltage supplied to the motor control apparatus; a control apparatus voltage detection unit that detects a voltage supplied from the DC power source to the automatic transmission control apparatus; a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and a voltage determination unit that determines which one of a voltage detected by the control apparatus voltage detection unit and a voltage detected by the motor voltage detection unit is utilized as the duty reference voltage. In the automatic transmission control apparatus, the motor control apparatus controls the motor, based on a motor drive duty that the drive duty calculation unit calculates by use of a voltage determined by the voltage determination unit.

An automatic transmission control apparatus according to the present invention changes transmission gear ratios of a transmission mechanism by use of a motor and includes a motor control apparatus that receives a voltage from a DC power source and controls the motor; a motor voltage detection unit that detects the voltage supplied to the motor control apparatus; a control apparatus voltage detection unit that detects a voltage supplied from the DC power source to the automatic transmission control apparatus; a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and a voltage determination unit that determines which one of a voltage detected by the control apparatus voltage detection unit and a voltage detected by the motor voltage detection unit is utilized as the duty reference voltage. In the automatic transmission control apparatus, the voltage determination unit is configured in such a way as to perform the determination, based on a difference between a voltage detected by the control apparatus voltage detection unit and a voltage detected by the motor voltage detection unit; and the motor control apparatus controls the motor, based on a motor drive duty that the drive duty calculation unit calculates by use of a voltage determined by the voltage determination unit.

An automatic transmission control apparatus according to the present invention changes transmission gear ratios of a transmission mechanism by use of a motor and includes a motor control apparatus that receives a voltage from a DC power source and controls the motor; a motor voltage detection unit that detects the voltage supplied to the motor control apparatus; a control apparatus voltage detection unit that detects a voltage supplied from the DC power source to the automatic transmission control apparatus; a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and a voltage determination unit that determines which one of a voltage detected by the control apparatus voltage detection unit and a voltage detected by the motor voltage detection unit is utilized as the duty reference voltage. In the automatic transmission control apparatus, the voltage determination unit is configured in such a way as to perform the determination, based on a difference between motor actual power consumed by the motor and motor command power for the motor; and the motor control apparatus controls the motor, based on a motor drive duty that the drive duty calculation unit calculates by use of a voltage determined by the voltage determination unit.

An automatic transmission control apparatus according to the present invention is provided with a voltage determination unit that determines which one of a voltage detected by a control apparatus voltage detection unit and a voltage detected by a motor voltage detection unit is utilized as a duty reference voltage; the motor control apparatus controls the motor, based on a motor drive duty that a drive duty calculation unit calculates by use of the voltage determined by the voltage determination unit. As a result, even in the case where an abnormality occurs in a unit for detecting a supply voltage to a motor control apparatus, the duty ratio is suppressed from increasing and a voltage to be applied to a motor and torque to be produced are suppressed from increasing, so that the safety in the motor operation is secured; and the controllability of the motor drive is not deteriorated, whereby the transmission mechanism of the automatic transmission is not erroneously operated.

An automatic transmission control apparatus according to the present invention is provided with a voltage determination unit that determines which one of a voltage detected by a control apparatus voltage detection unit and a voltage detected by a motor voltage detection unit is utilized as a duty reference voltage; the voltage determination unit is configured in such a way as to perform the determination, based on a difference between a voltage detected by the control apparatus voltage detection unit and a voltage detected by the motor voltage detection unit; and the motor control apparatus controls the motor, based on a motor drive duty that a drive duty calculation unit calculates by use of the voltage determined by the voltage determination unit. As a result, even in the case where an abnormality exists in a unit that detects a voltage supplied to the motor control apparatus, the determination can readily be performed with a simple configuration; therefore, the automatic transmission control apparatus secures the safety of a motor drive by suppressing increase in the duty ratio, thereby suppressing increase in a voltage applied to the motor and increase in torque to be produced, and neither deteriorates the controllability of the motor drive nor erroneously operates the transmission mechanism of the automatic transmission.

An automatic transmission control apparatus according to the present invention is provided with a voltage determination unit that determines which one of a voltage value detected by a control apparatus voltage detection unit and a voltage value detected by a motor voltage detection unit is utilized as a duty reference voltage; the voltage determination unit is configured in such a way as to perform the determination, based on a difference between motor actual power consumed by the motor and motor command power for the motor; and the motor control apparatus controls the motor, based on a motor drive duty calculated by use of the determined voltage value. As a result, even in the case where an abnormality exists in a unit that detects a voltage supplied to the motor control apparatus, the determination can readily be performed with a simple configuration; therefore, the automatic transmission control apparatus secures the safety of a motor drive by suppressing increase in the duty ratio, thereby suppressing increase in a voltage applied to the motor and increase in torque to be produced, and neither deteriorates the controllability of the motor drive nor erroneously operates the transmission mechanism of the automatic transmission.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 8 is a timing chart for explaining the operation of an automatic transmission control apparatus according to Embodiment 2 of the present invention.

DETAILED DESCRIPTION OF THE PREFERRED EMBODIMENTS

Embodiment 1

Figure 1:
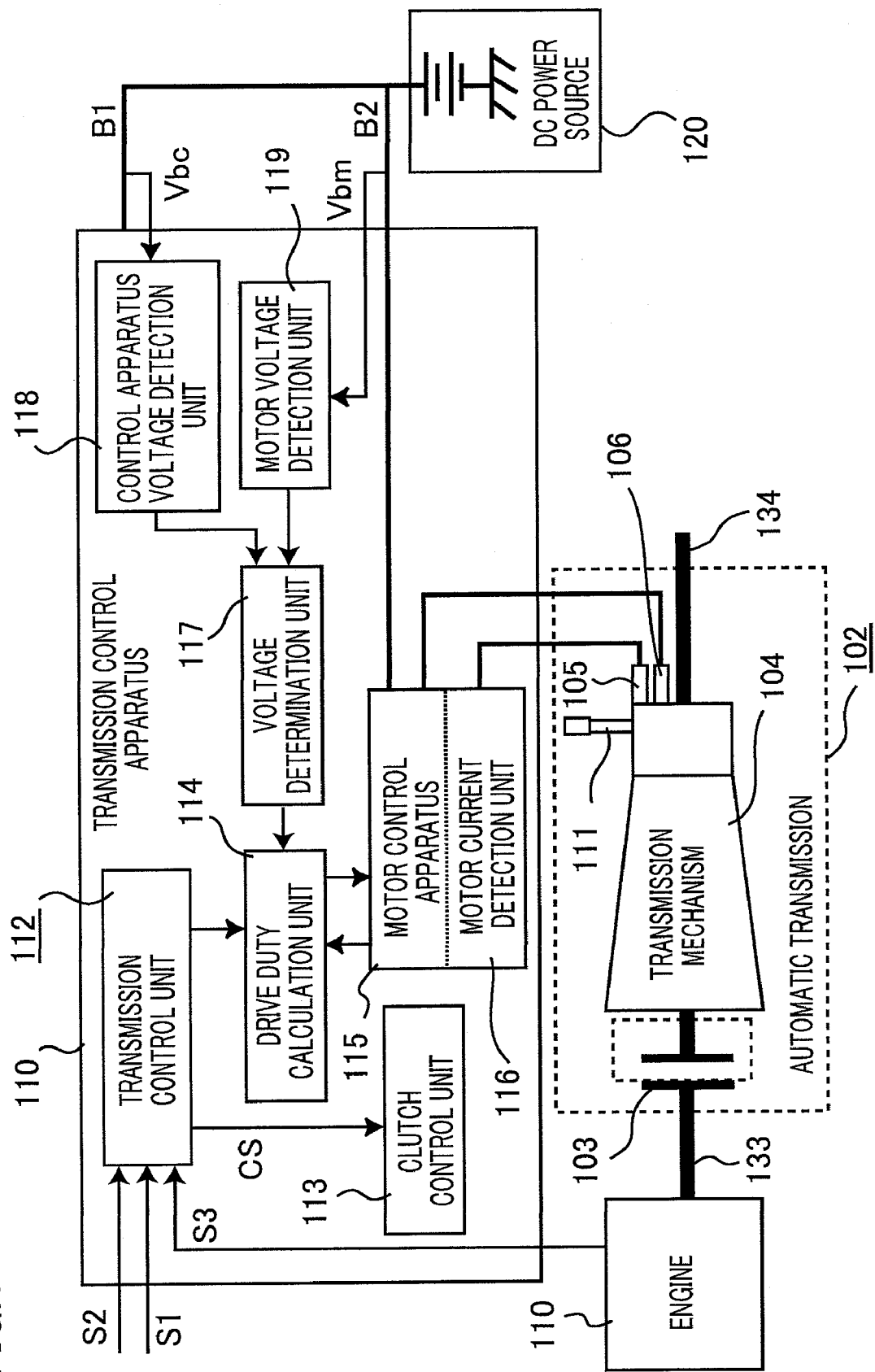
FIG. 1 is a block diagram illustrating the configuration of an automatic transmission control apparatus according to Embodiment 1 of the present invention.

An automatic transmission control apparatus according to Embodiment 1 of the present invention will be explained below. FIG. 1 is a block diagram illustrating the configuration of an automatic transmission control apparatus according to Embodiment 1 of the present invention. In FIG. 1, an automatic transmission 102 is provided with an input axle 133 coupled with an engine 101 of a vehicle; a clutch 103 provided on the input axle 133; a transmission mechanism 104 that changes the speed of the driving power of the engine 101 conveyed from the input axle 133 by the intermediary of the clutch 103; and an output axle 134 that conveys to the wheels of the vehicle the driving power the speed of which has been changed by the transmission 104.

Unlike a manual transmission that changes transmission gear ratios through manual operation, the automatic transmission 102 changes the transmission gear ratios by controlling a motor as an actuator; the automatic transmission 102 changes the gear ratios of a transmission mechanism 104 by operating a transmission lever through a shift direction motor and a selection direction motor. The shift direction motor 105 moves the transmission lever 111 in a shift direction; the selection direction motor 106 moves the transmission lever 111 in a selection direction.

Figure 2:
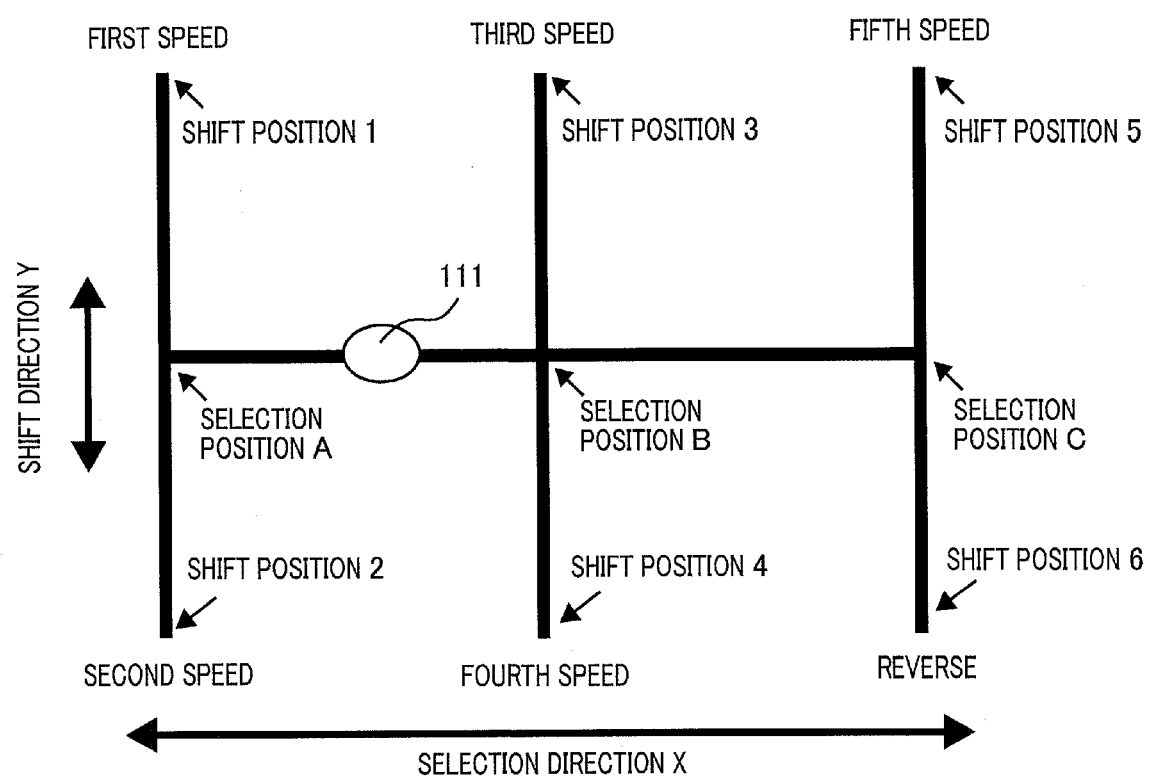
FIG. 2 is an explanatory diagram for explaining the changing of automatic-transmission gear ratios in an automatic transmission control apparatus according to Embodiment 1 of the present invention.

FIG. 2 is an explanatory diagram for explaining the changing of transmission gear ratios of the automatic transmission 102 in an automatic transmission control apparatus according to Embodiment 1 of the present invention. In FIG. 2, the shift direction motor 105 and the selection direction motor 106 illustrated in FIG. 1 described above operate and move the transmission lever 111 in the shift direction Y and the selection direction X, respectively.

The input axle 133 and the output axle 134 of the automatic transmission 102 are coupled with each other by the intermediary of a gear corresponding to the shift position of the transmission lever 111. In other words, the input axle 133 and the output axle 134 are coupled with each other by the intermediary of a first speed gear in the case where the transmission lever 111 moves to a shift position 1; the input axle 133 and the output axle 134 are coupled with each other by the intermediary of a second speed gear in the case where the transmission lever 111 moves to a shift position 2; the input axle 133 and the output axle 134 are coupled with each other by the intermediary of a third speed gear in the case where the transmission lever 111 moves to a shift position 3; the input axle 133 and the output axle 134 are coupled with each other by the intermediary of a fourth speed gear in the case where the transmission lever 111 moves to a shift position 4; the input axle 133 and the output axle 134 are coupled with each other by the intermediary of a fifth speed gear in the case where the transmission lever 111 moves to a shift position 5; the input axle 133 and the output axle 134 are coupled with each other by the intermediary of a reverse gear in the case where the transmission lever 111 moves to a shift position 6. In the case where the transmission lever 111 moves to a selection position A, a selection position B, or a selection position C, the input axle 133 and the output axle 134 are not coupled with each other by any gear, but are in a neutral state.

Figure 3:
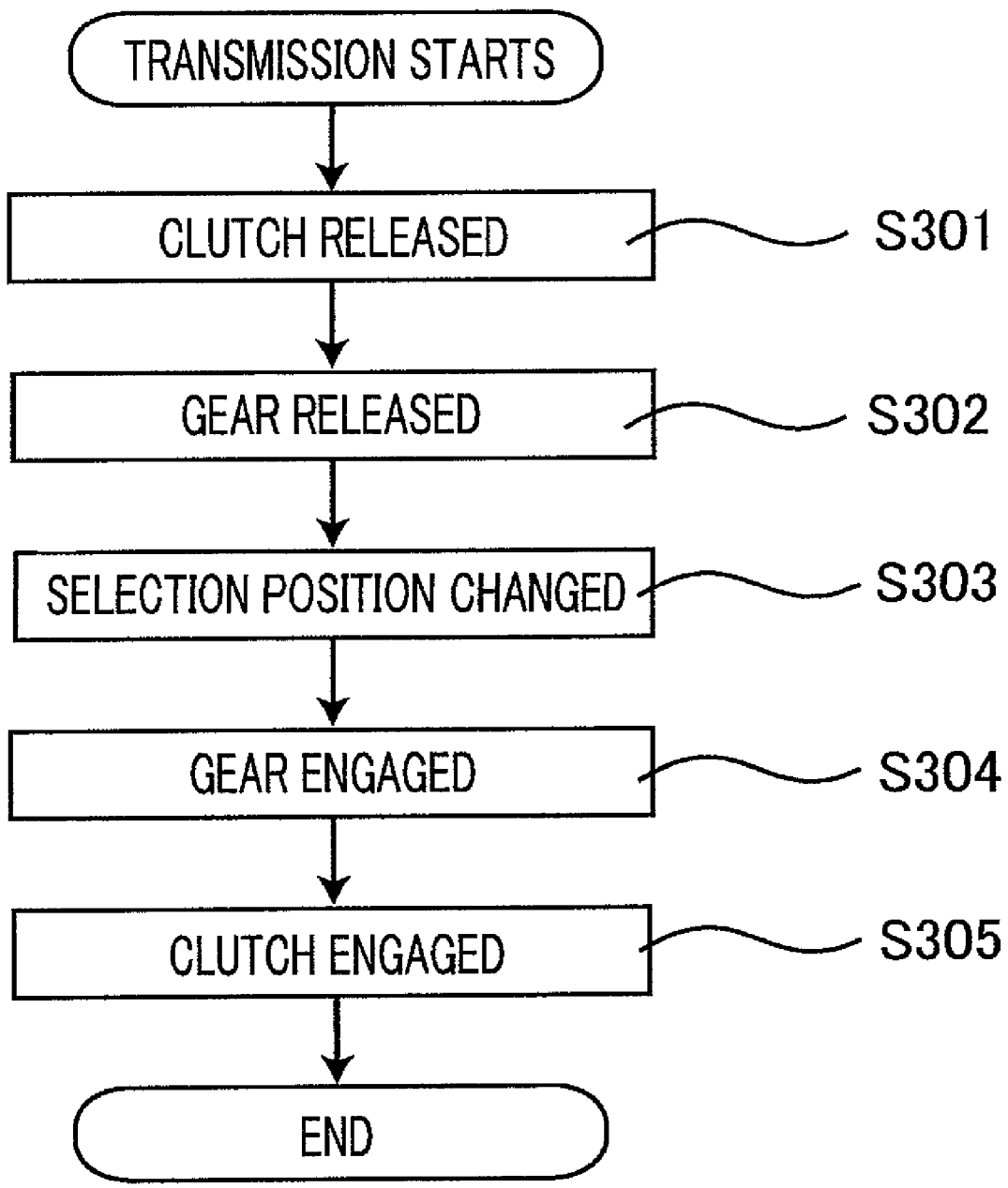
FIG. 3 is a flowchart for explaining the operation of an automatic transmission control apparatus according to Embodiment 1 of the present invention in the case where the automatic transmission changes gears from the second to the third speed gear.

FIG. 3 is a flowchart for explaining the operation of an automatic transmission control apparatus in the case where the automatic transmission changes gears from the second speed gear to the third speed gear. In the case where the vehicle travels with the second speed gear, the transmission lever 111 is at the shift position 2. In the step S301 illustrated in FIG. 3, in order to change transmission gears, a clutch control unit 113 described later releases the clutch 103. In the step S302, the shift direction motor 105 moves the transmission lever 111, which is at the shift position 2, to the selection position A. By moving the transmission lever 111 to the selection position A, the first speed gear is released and comes into a neutral state.

In the step S303, the selection direction motor 106 moves the transmission lever 111 to the selection position B. In the step S304, the shift direction motor 105 moves the transmission lever 111 to the shift position 3. By moving the transmission lever 111 to the shift position 3, the third speed gear is coupled and the transmission gear ratio becomes the third speed ratio. In the step S305, the clutch control unit 113 makes the clutch 103 coupled, so that the transmission operation ends.

Next, a transmission control apparatus 110 will be explained. In FIG. 1, the transmission control apparatus 110 is provided with a transmission control unit 112, the clutch control unit 113, the drive duty calculation unit 114, a voltage determination unit 117, a control apparatus voltage detection unit 118, and a motor voltage detection unit 119. A motor control apparatus 115 and a motor current detection unit 116 are incorporated in the transmission control apparatus 110. The motor control apparatus 115 is configured in such a way as to control the shift direction motor 105 and the selection direction motor 106, for example, through PWM control. A DC power source 120 mounted in the vehicle supplies a voltage to the transmission control apparatus 110 and the motor control apparatus 115.

The transmission control unit 112 calculates a transmission gear ratio, based on driver operation information S1, such as the accelerator opening level determined by a driver, transmitted from an unillustrated engine control unit (referred to as an ECU, hereinafter), vehicle speed information S2, engine information S3 such as the rotation speed of the engine 101, and the like, and inputs command information CS and a motor target current It corresponding to the calculated transmission gear ratio to the clutch control unit 113 and the drive duty calculation unit 114, respectively.

The clutch control unit 113 controls the coupling and release of the clutch 103, based on the command information CS from the transmission control unit 112. As an actuator for controlling the clutch 103, for example, a hydraulic pressure control valve, a motor, or the like is utilized.

The DC power source 120 supplies respective voltages to the transmission control apparatus 110 and the motor control apparatus 115 by way of a power supply path that ramifies into two power supply branches B1 and B2, respectively. The reason why the DC power source 120 separately supplies the respective voltages to the transmission control apparatus 110 and the motor control apparatus 115 by way of the power supply branches B1 and B2 is as follows:

The transmission control apparatus 110 and the motor control apparatus 115 are different from each other in their inner resistance; therefore, even though the same voltage is supplied to the transmission control apparatus 110 and the motor control apparatus 115, the respective voltage drop amounts differ from each other. Accordingly, a single voltage supply path causes a drop in the voltage supplied to the transmission control apparatus 110 when the motor is driven, whereby an erroneous operation of the transmission control apparatus 110 is caused; on the other hand, the operation of the transmission control apparatus 110 may cause a drop in the voltage supplied to the motor control apparatus 115, whereby accurate control of the motor may be difficult.

Therefore, the DC power source 120 supplies the respective voltages to the transmission control apparatus 110 and the motor control apparatus 115 by way of a power supply path that ramifies into the two power supply branches B1 and B2, so that the transmission control apparatus 110 and the motor control apparatus 115 do not affect each other and can stably be operated.

The control apparatus voltage detection unit 118 detects the voltage that is supplied from the DC power source 120 to the transmission control apparatus 110 via the power supply branch B1 and inputs the detected voltage, as a control apparatus voltage detection value Vbc, to the voltage determination unit 117. The motor voltage detection unit 119 detects the voltage that is supplied from the DC power source 120 to the motor control apparatus 115 via the power supply branch B2 and inputs the detected voltage, as a motor voltage detection value Vbm, to the voltage determination unit 117.

The voltage determination unit 117 determines in such a manner as described later the control apparatus voltage detection value Vbc inputted by the control apparatus voltage detection unit 118 and the motor voltage detection value Vbm inputted by the motor voltage detection unit 119; based on the result of the determination, one of the control apparatus voltage detection value Vbc and the motor voltage detection value Vbm is selected and inputted to the drive duty calculation unit 114.

The drive duty calculation unit 114 calculates a motor rotation speed Nm, based on information inputted thereto via the motor control apparatus 115, and calculates a motor drive duty M_DUTY to be fed to the motor control apparatus 115, based on a target current It inputted thereto by the transmission control unit 112, a motor current Ir detected by the motor current detection unit 116, and the calculated motor rotation speed Nm. The drive duty calculation unit 114 utilizes, as a duty reference voltage Vb, the voltage value inputted thereto by the voltage determination unit 117, and calculates the motor drive duty M_DUTY. The motor drive duty M_DUTY calculated by the drive duty calculation unit 114 is inputted to the motor control apparatus 115.

In accordance with the motor drive duty M_DUTY inputted thereto by the drive duty calculation unit 114, the motor control apparatus 115 controls the shift direction motor 105 and the selection direction motor 106 so as to operate the transmission lever 111, as described above, thereby setting the transmission mechanism 104 to the transmission gear ratio corresponding to the command information CS inputted from the transmission control unit 112.

On the other hand, the respective currents that flow in the shift direction motor 105 and the selection direction motor 106 are detected by the motor current detection unit 116 incorporated in the motor control apparatus 115, and the detected respective currents are inputted from the motor current detection unit 116 to the drive duty calculation unit 114. As a means for detecting the respective currents in the shift direction motor 105 and the selection direction motor 106, for example, there is utilized a method utilizing a current sensor, a bus bar current detection method utilizing a shunt resistor, an arm current detection method, or the like.

Figure 4:
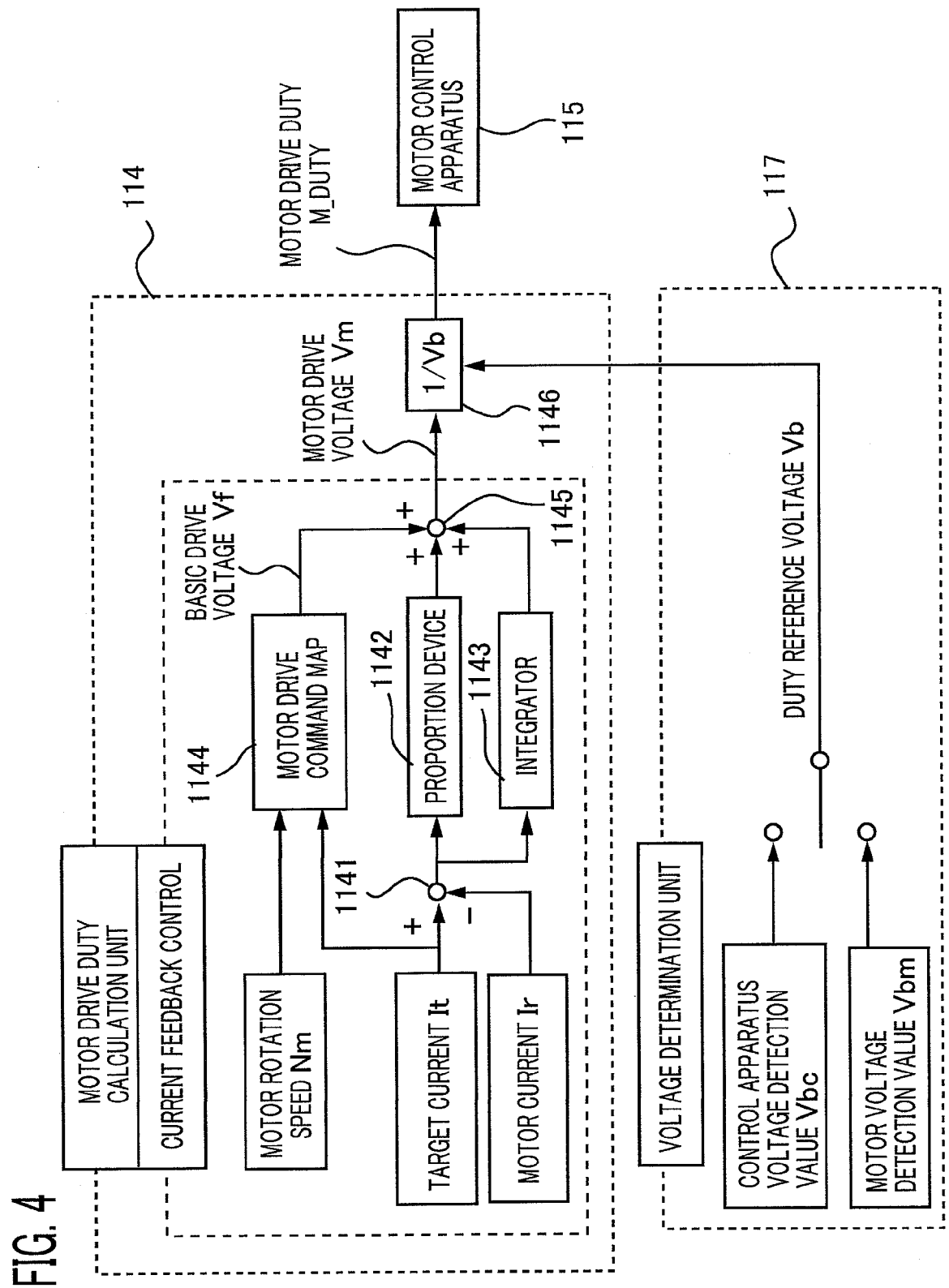
FIG. 4 is a block diagram illustrating the configurations of a motor drive duty calculation unit and a voltage determination unit in an automatic transmission control apparatus according to Embodiment 1 of the present invention.

FIG. 4 is a block diagram illustrating the configurations of the motor drive duty calculation unit 114 and the voltage determination unit 117 in an automatic transmission control apparatus according to Embodiment 1 of the present invention. Next, the calculation of the motor drive duty in the drive duty calculation unit 114 will be explained with reference to FIG. 4.

In FIG. 4, the calculation of the motor drive duty M_DUTY in the drive duty calculation unit 114 is performed through a current feedback control. In the current feedback control, the motor current Ir detected by the motor current detection unit 116 is controlled in such a way as to coincide with the target current It inputted from the transmission control unit 112; firstly, the current difference between the motor current Ir detected by the motor current detection unit 116 and the target current It, inputted by the transmission control unit 112, corresponding to the transmission gear ratio is calculated by a subtractor 1141; then, a proportion device 1142 calculates a proportion term, based on the current difference, and an integrator 1143 calculates an integration term, based on the current difference.

Based on the motor rotation speed Nm calculated by the drive duty calculation unit 114 via the motor control apparatus 115 and the target current It inputted from the transmission control unit 112, a basic drive voltage Vf is calculated from a motor drive voltage map 1144 that is preliminarily stored in the drive duty calculation unit 114. By adding up the calculated basic drive voltage Vf, and the proportion term and the integration term calculated by the proportion device 1142 and the integrator 1143, respectively, by an adder 1145, a motor drive voltage Vm is calculated. In such a way as described above, the motor drive voltage Vm is calculated through the current feedback control.

On the other hand, the voltage determination unit 117 determines in such a manner as described later the control apparatus voltage detection value Vbc, which is a voltage detected by the control apparatus voltage detection unit 118, and the motor voltage detection value Vbm, which is a voltage detected by the motor voltage detection unit 119; the voltage determination unit 117 selects one of the control apparatus voltage detection value Vbc and the motor voltage detection value Vbm, in accordance with the result of the determination; and the voltage determination unit 117 inputs the selected voltage, as the duty reference voltage Vb, to a divider 1146 in the drive duty calculation unit 114. As described later, in the case where no abnormality exists in the motor voltage detection unit 119, as the duty reference voltage Vb, the motor voltage detection value Vbm detected by the motor voltage detection unit 119 is utilized.

The divider 1146 divides the motor drive voltage Vm inputted from the adder 1145 by the duty reference voltage Vb so as to calculate the motor drive duty M_DUTY, and inputs the motor drive duty M_DUTY to the motor control apparatus 115. The motor drive duty calculation unit 114 performs the calculation of the motor drive duty M_DUTY for each of the shift direction motor 105 and the selection direction motor 106, and in accordance with the calculated motor drive duty M_DUTY, controls the motor control apparatus 115 so as to drive the shift direction motor 105 and the selection direction motor 106.

Figure 5:
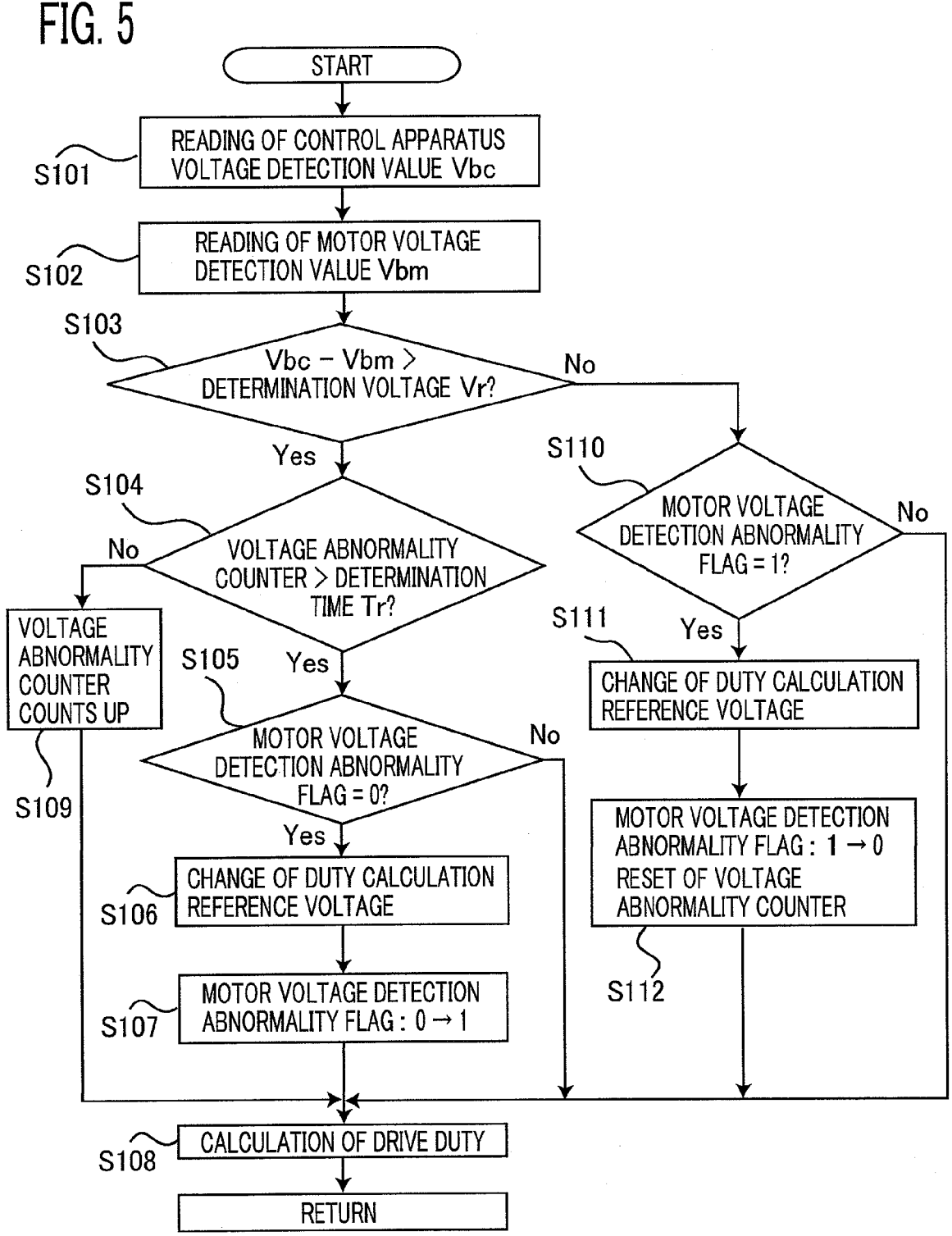
FIG. 5 is a flowchart for explaining the operation of an automatic transmission control apparatus according to Embodiment 1 of the present invention.

Next, the operation of the voltage determination unit 117 will be explained in detail. FIG. 5 is a flowchart for explaining the operation of an automatic transmission control apparatus according to Embodiment 1 of the present invention; the operation of the voltage determination unit 117 is performed for each of the shift direction motor 105 and the selection direction motor 106. In FIG. 5, firstly, in the step S101, the control apparatus voltage detection value Vbc detected by the control apparatus voltage detection unit 118 is read. Next, in the step S102, the motor voltage detection value Vbm detected by the motor voltage detection unit 119 is read.

In the step S103, it is determined whether or not the difference between the control apparatus voltage detection value Vbc and the motor voltage detection value Vbm is the same as or more than a predetermined determination voltage Vr. Through this determination, it is determined whether or not the difference between the control apparatus voltage detection value Vbc and the motor voltage detection value Vbm is the same as or more than a predetermined determination voltage Vr, i.e., whether or not the motor voltage detection value Vbm is smaller than the control apparatus voltage detection value Vbc.

After the determination performed in the step S103, in the case where the difference between the control apparatus voltage detection value Vbc and the motor voltage detection value Vbm is greater than the predetermined determination voltage Vr, the outcome of the determination is "Yes", and the step S103 is followed by the step S104; in the case where the difference between the control apparatus voltage detection value Vbc and the motor voltage detection value Vbm is smaller than the predetermined determination voltage Vr, the outcome of the determination is "No" and voltage determination processing is not performed; then, the step S103 is followed by the step S110. In this situation, the determination voltage Vr is set in such a way as not to cause an erroneous determination; for example, it is set to 3 [V].

In the case where the outcome of the determination in the step S103 is "No", the step S103 is followed by the step S110, where it is determined whether or not a motor voltage detection abnormality flag is "1". The motor voltage detection abnormality flag is set in the step S107 described later and becomes "1" in the case where an abnormality in the motor voltage detection unit 119 has become definite.

After the determination performed in the step S110, in the case where the motor voltage detection abnormality flag is "1", the outcome of the determination is "Yes" and it is suggested that an abnormality in the motor voltage detection unit 119 has become definite; however, the outcome of the determination in the step S103 is "No", i.e., the difference between the motor voltage detection value Vbm and the control apparatus voltage detection value Vbc is the same as or smaller than the predetermined determination voltage Vr; thus, it is suggested that the abnormality in the motor voltage detection unit 119 has been eliminated.

In contrast, in the case where the outcome of the determination performed in the step S110 is "No", no abnormality exists in the motor voltage detection unit 119 and no abnormality has become definite; therefore, the step 110 is followed by the step S108, where the motor drive duty M_DUTY is calculated with the motor voltage detection value Vbm utilized as the duty reference voltage Vb, and then the step S101 is resumed.

In the case where the outcome of the determination performed in the step S110 is "Yes", the step S110 is followed by the step S111, where the voltage value utilized as the duty reference voltage Vb that is utilized for calculating the motor drive duty M_DUTY is changed from the control apparatus voltage detection value Vbc to the motor voltage detection value Vbm. This is because, as described above, the abnormality in the motor voltage detection unit 119 has been eliminated. Next, the step S111 is followed by the step S112, where the motor voltage detection abnormality flag is set to "1" and a voltage abnormality counter is reset; after that, the step S112 is followed by the step S108, where the motor drive duty M_DUTY is calculated, and then step S101 is resumed.

In contrast, in the case where the outcome of the determination performed in the step S103 is "Yes", the step S103 is followed by the step S104, where it is determined whether or not the counter value of the voltage abnormality counter is the same as or greater than a predetermined determination time Tr. Through this determination, there is determined a continuous time in which the motor voltage detection value Vbm is smaller than the control apparatus voltage detection value Vbc.

In the determination performed in the step S104, in the case where it is determined that the counter value of the voltage abnormality counter is greater than the predetermined determination time Tr, the outcome of the determination is "Yes". The "Yes" determination in the step S104 suggests that, for a time period longer than the predetermined determination time Tr, there continues a condition in which the difference between the control apparatus voltage detection value Vbc and the motor voltage detection value Vbm is greater than the predetermined determination voltage Vr. After the determination performed in the step S104, in the case where the outcome of the determination is "Yes", the step S104 is followed by the step S105. In the step S105, it is determined whether or not the motor voltage detection abnormality flag is "0"; in the case where the motor voltage detection abnormality flag is "0", the outcome of the determination is "Yes", and then the step S105 is followed by the step S106.

In contrast, in the case where the outcome of the determination performed in the step S104 is "No", it suggests that the condition in which the difference between the control apparatus voltage detection value Vbc and the motor voltage detection value Vbm is greater than the predetermined determination voltage Vr has not continued for a time period longer than the predetermined determination time Tr; therefore, the step S104 is followed by the step S109, where the counter value of the voltage abnormality counter is counted up, and then the step S109 is followed by the step S108. In the step S108, the motor drive duty M_DUTY is calculated, and then the step S101 is resumed. The predetermined determination time Tr in the step S104 is set, for example, to 0.5 [sec].

Next, in the case where the outcome of the determination performed in the step S104 is "Yes", the step S104 is followed by the step S105. The fact that the step S104 is followed by the step S105 suggests that, for a time period longer than the predetermined determination time Tr, there continues a condition in which the difference between the control apparatus voltage detection value Vbc and the motor voltage detection value Vbm is greater than the predetermined determination voltage Vr and the motor voltage detection value Vbm is smaller than the control apparatus voltage detection value Vbc.

In the step S105, it is determined whether or not the motor voltage detection abnormality flag is "0". The motor voltage detection abnormality flag is set in the step S107 described later; in the case where an abnormality in the motor voltage detection unit 119 has become definite, the motor voltage detection abnormality flag becomes "1". Because, in the routine in which the step S104 is followed by the step S105 for the first time, the motor voltage detection abnormality flag is "0", the outcome of the determination is "Yes", and the step S105 is followed by the step S106.

When the step S105 is followed by the step S106 after the outcome of the determination in the step S105 has become "Yes", the difference between the control apparatus voltage detection value Vbc and the motor voltage detection value Vbm is the same as or more than a predetermined determination voltage Vr and a time period the same as or longer than the predetermined determination time Tr has elapsed; therefore, in the drive duty calculation unit 114, the voltage value as the duty reference voltage Vb that is utilized for calculating the motor drive duty M_DUTY is changed from the motor voltage detection value Vbm to the control apparatus voltage detection value Vbc, and then the step S106 is followed by the step S107.

As described above, a condition in which the motor voltage detection value Vbm is smaller than the control apparatus voltage detection value Vbc has continued for a time period the same as or longer than the predetermined determination time Tr, and the voltage value as the duty reference voltage Vb that is utilized for calculating the motor drive duty M_DUTY has been changed from the motor voltage detection value Vbm to the control apparatus voltage detection value Vbc; thus, in the step S107, the motor voltage detection abnormality flag is set to "1"; then, the step S107 is followed by the step S108, and the step S101 is resumed.

When the step S104 is followed by the step S105 in the second routine of the flowchart represented in FIG. 5 or thereafter, the motor voltage detection abnormality flag is "1"; the voltage value as the duty reference voltage Vb that is utilized for calculating the motor drive duty M_DUTY in the drive duty calculation unit 114 has been changed to the control apparatus voltage detection value Vbc detected by the control apparatus voltage detection unit 118; and the motor voltage detection abnormality flag has been set to "1" in the step S107. As a result, the outcome of the determination performed in the step S105 becomes "No". After that, the step S105 is followed by the step S108, where the motor drive duty M_DUTY is calculated, and then the step S101 is resumed.

Figure 6:
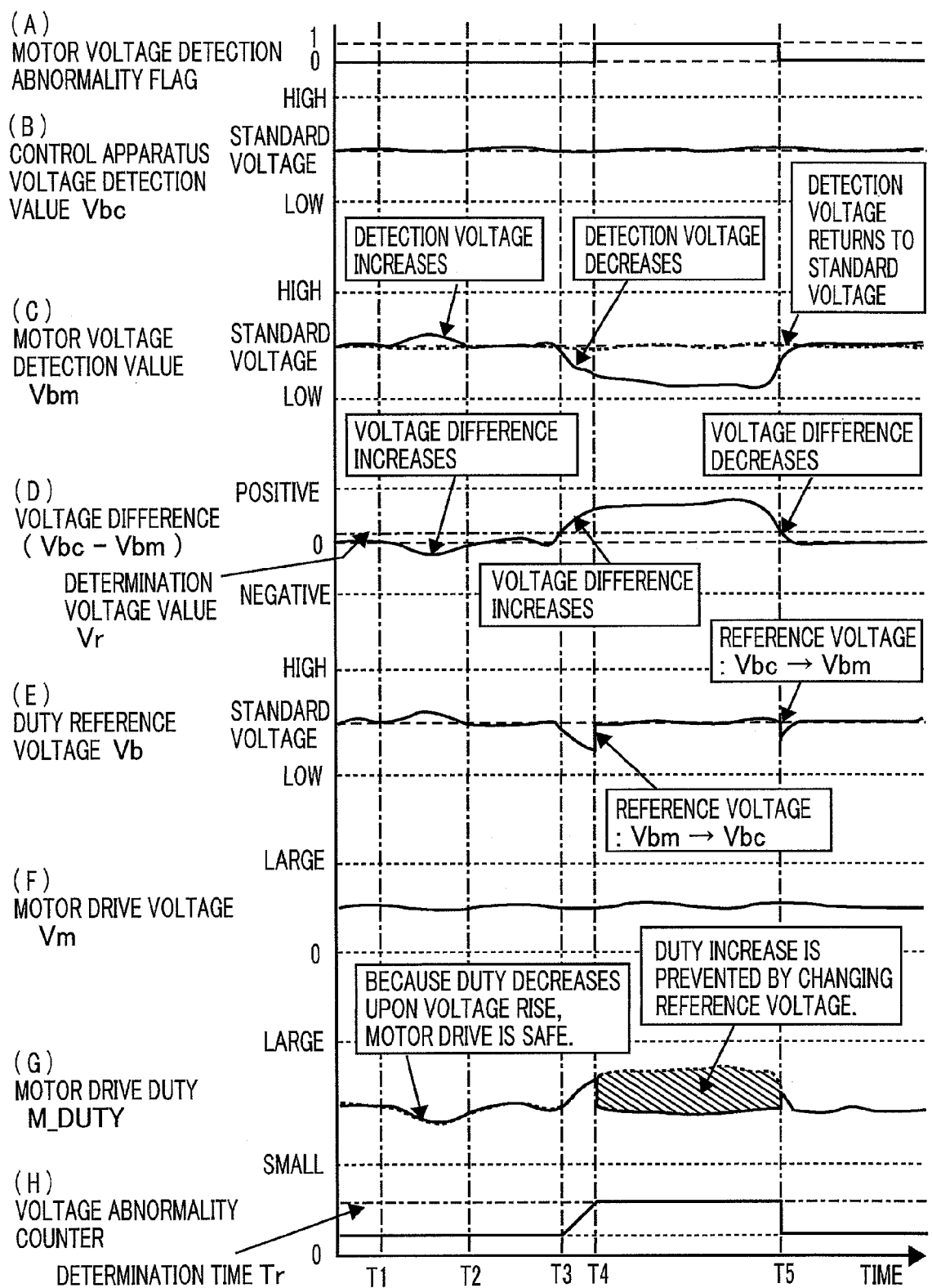
FIG. 6 is a timing chart for explaining the operation of an automatic transmission control apparatus according to Embodiment 1 of the present invention.

Next, the operation of the automatic transmission control apparatus according to Embodiment 1 of the present invention will be explained with reference to a timing chart represented in FIG. 6. FIG. 6 is a timing chart for explaining the operation of the automatic transmission control apparatus according to Embodiment 1 of the present invention, especially, a timing chart for a case where the motor is driven through the motor drive duty M_DUTY calculated by the drive duty calculation unit 114 in accordance with the transmission gear ratio corresponding to the command information CS from the transmission control unit 112; the chart (A) represents the motor voltage detection abnormality flag; the chart (B), the control apparatus voltage detection value Vbc; the chart (C), the motor voltage detection value Vbm; the chart (D), the voltage difference (Vbc−Vbm); the chart (E), the duty reference voltage Vb; the chart (F), the motor drive voltage Vm; the chart (G), the motor drive duty M_DUTY; and the chart (H) represents the counter value of the voltage abnormality counter.

In FIG. 6, firstly, in the case where, while the motor is driven, the motor voltage detection value Vbm increases during a time period from a time instant T1 to a time instant T2 (refer to the chart (C)), the voltage difference between the control apparatus voltage detection value Vbc and the motor voltage detection value Vbm (Vbc−Vbm) becomes a negative value and increases in the negative direction (refer to the chart (D)); however, because the motor drive duty M_DUTY decreases (refer to the chart (G)), the motor drive becomes safer and the controllability of the motor drive does not deteriorate; thus, the transmission mechanism 104 does not erroneously operate.

Next, in the case where, after a time instant T3, a certain abnormality in the motor voltage detection unit 119 causes the motor voltage detection value Vbm to start to decrease (refer to the chart (C)), the voltage difference (Vbc−Vbm) becomes a positive value and largely increases (refer to the chart (D)). After that, when the difference between the control apparatus voltage detection value Vbc and the motor voltage detection value Vbm becomes the same as or greater than the predetermined determination voltage Vr, the voltage abnormality counter starts to count up (refer to the chart (H)). Because, even while the voltage abnormality counter counts up, the motor voltage detection value Vbm decreases (refer to the chart (C)), the motor drive duty M_DUTY becomes a large value (refer to the chart (G)).

After that, when at a time instant T4, the duration of counting up by the voltage abnormality counter exceeds the predetermined determination time Tr (refer to the chart (H)), an abnormality in the motor voltage detection unit 119 becomes definite, and the duty reference voltage Vb utilized for calculating the motor drive duty M_DUTY is changed to the control apparatus voltage detection value Vbc (refer to the chart (E)); therefore, the motor drive duty M_DUTY decreases (refer to the chart (G)).

Additionally, because, at the time instant T4, the abnormality in the motor voltage detection unit 119 becomes definite, the motor voltage detection abnormality flag changes from "0" to "1" (refer to the chart (A)), and the duty reference voltage Vb changes from the motor voltage detection value Vbm to the control apparatus voltage detection value Vbc. Due to the foregoing operation (refer to the chart (E)), the motor drive duty M_DUTY decreases (refer to the chart (G)); therefore, the voltage applied to the motor is reduced (refer to the chart (C)), whereby the safety of the motor drive can be secured. Moreover, because the motor drive duty M_DUTY decreases (refer to the chart (G)), the controllability of the motor drive is prevented from being deteriorated, and the transmission mechanism 104 is not erroneously operated.

The motor voltage detection value Vbm starts to increase approximately from a time instant immediately before the time instant T5 (refer to the chart (C)), and immediately after the time instant T5, becomes a voltage near to the standard voltage, thereby returning to the state at the time before the time instant T3 (refer to the chart (C)). After that, when the voltage difference (Vbc−Vbm) between the control apparatus voltage detection value Vbc and the motor voltage detection value Vbm decreases and becomes the same as or smaller than the predetermined determination voltage Vr (refer to the chart (D)), it is determined that the abnormality in the motor voltage detection unit 119 has been eliminated; therefore, the voltage value as the duty reference voltage Vb that is utilized for calculating the motor drive duty M_DUTY in the drive duty calculation unit 114 is changed from the control apparatus voltage detection value Vbc to the motor voltage detection value Vbm (refer to the chart (E)).

Additionally, at the time instant T5, the motor voltage detection abnormality flag changes from "1" to "0" (refer to the chart (A)), and the voltage abnormality counter is reset (refer to the chart (H)). Regardless of the foregoing operation, the motor voltage detection value Vbm is approximately equal to the control apparatus voltage detection value Vbc (refer to the charts (B) and (C)); thus, the motor drive duty M_DUTY is suppressed from increasing (refer to the chart (G)), whereby the safety of the motor drive can be secured, and the controllability of the motor drive does not deteriorate.

As a result, because the controllability of the motor drive does not deteriorate, the transmission mechanism 104 is not erroneously operated. Moreover, because the motor voltage detection value Vbm is utilized as the duty reference voltage Vb (refer to the chart (E)), the motor drive duty M_DUTY can be calculated based on the voltage supplied to the motor control apparatus 115, whereby high-accuracy motor drive can be performed, so that the transmission mechanism 104 can accurately be controlled.

As described above, even in the case where an abnormality occurs in the motor voltage detection unit 119 and the motor voltage detection value Vbm decreases (refer to the chart (C)), the voltage as the duty reference voltage Vb that is utilized for calculating the motor drive duty M_DUTY in the drive duty calculation unit 114 is changed from the motor voltage detection value Vbm to the control apparatus voltage detection value Vbc (refer to the chart (E)). Accordingly, it goes without saying that the abnormality in the motor voltage detection unit 119 can be performed, and the motor drive duty M_DUTY is not erroneously calculated; therefore, increase in the motor drive duty M_DUTY due to an erroneous calculation can be suppressed (refer to the chart (G)), whereby increase in the voltage to be applied to the motor can be suppressed (refer to the chart (C)). Moreover, because increase in the voltage applied to the motor is suppressed, the safety of the motor can be secured; thus, the controllability of the motor drive is prevented from being deteriorated. Still moreover, because the controllability of the motor drive is prevented from being deteriorated, the transmission mechanism 104 is not erroneously operated.

When the abnormality is eliminated from the motor voltage detection unit 119, the voltage as the duty reference voltage Vb that is utilized for calculating the motor drive duty M_DUTY in the drive duty calculation unit 114 is changed from the control apparatus voltage detection value Vbc to the motor voltage detection value Vbm (refer to the chart (E)); therefore, because the motor drive and the calculation of the motor drive duty M_DUTY can be performed based on the voltage supplied to the motor control apparatus 115, the safety of the motor can be secured, whereby high-accuracy motor drive can be performed without deteriorating the controllability of the motor drive; thus, the transmission mechanism 104 can accurately be controlled.

In the foregoing automatic transmission control apparatus according to Embodiment 1 of the present invention, even in the case where an abnormality occurs in the motor voltage detection unit 119 and the motor voltage detection value Vbm decreases, the duty reference voltage Vb that is utilized for calculating the motor drive duty M_DUTY in the drive duty calculation unit 114 is changed from the motor voltage detection value Vbm to the control apparatus voltage detection value Vbc; therefore, increase in the motor drive duty M_DUTY is suppressed, whereby the voltage applied to the motor can be prevented from increasing. Moreover, because increase in the voltage applied to the motor can be suppressed, the safety of the motor drive can be secured. Still moreover, because increase in the voltage applied to the motor can be suppressed, the controllability of the motor drive is prevented from being deteriorated, and the transmission mechanism 104 is not erroneously operated. Furthermore, an abnormality in the motor voltage detection unit 119 can be detected based on the method in which the voltage as the duty reference voltage Vb is changed from the motor voltage detection value Vbm to the control apparatus voltage detection value Vbc.

Additionally, when an abnormality is eliminated from the motor voltage detection unit 119, the duty reference voltage Vb that is utilized for calculating the motor drive duty M_DUTY in the drive duty calculation unit 114 is changed from the control apparatus voltage detection value Vbc to the motor voltage detection value Vbm; therefore, the motor drive duty M_DUTY can be calculated based on the voltage supplied to the motor control apparatus 115, whereby high-accuracy motor drive can be performed, so that the transmission mechanism 104 can accurately be controlled.

Additionally, in Embodiment 1, as the motor drive method, there has been explained a method in which the motor drive duty M_DUTY is calculated, as described above, through current feedback control utilizing a motor current; however, the present invention is not limited thereto, i.e., the present invention can be applied to a case where the motor drive is performed without utilizing the current feedback control.

Embodiment 2

Figure 7:
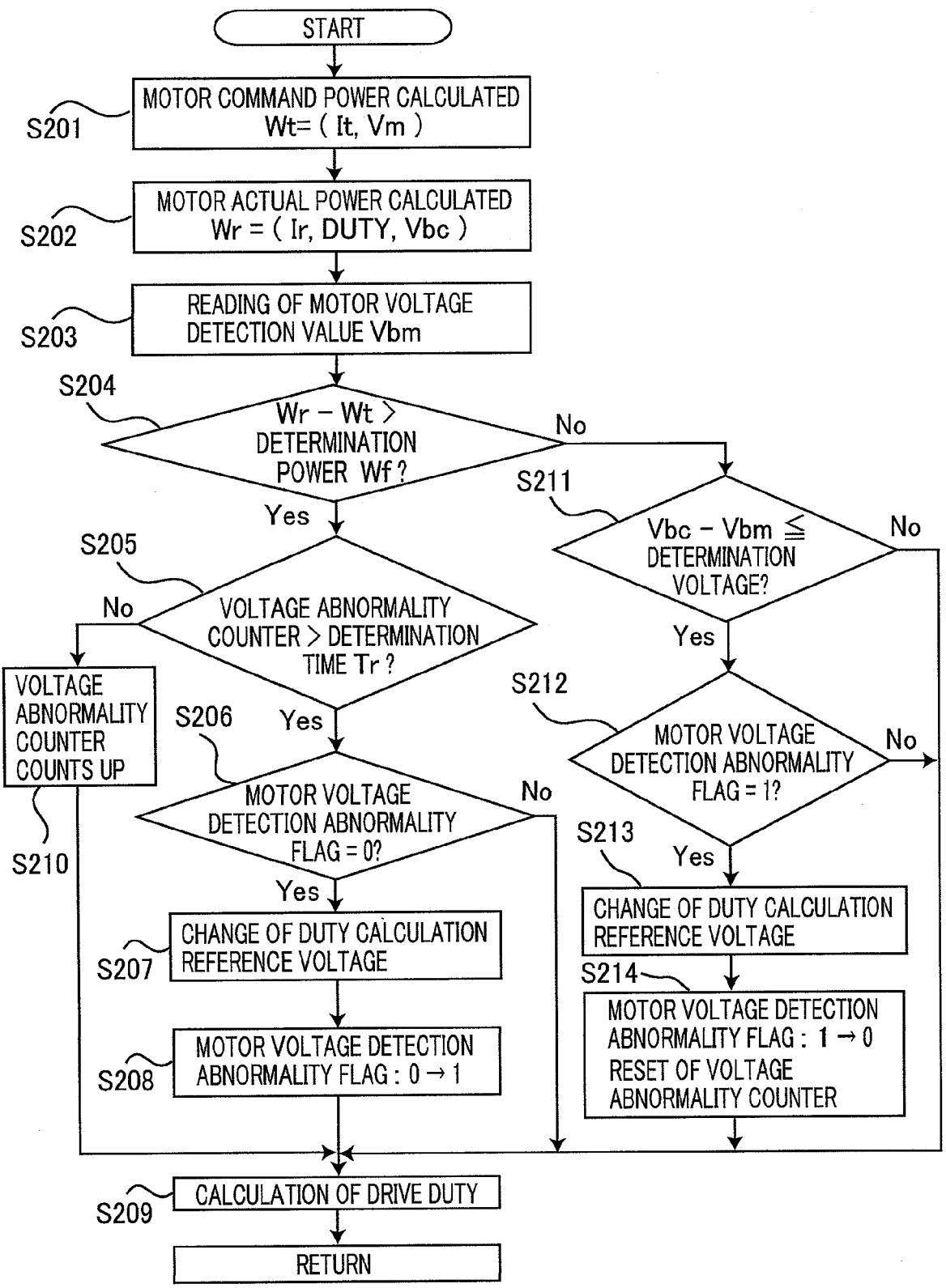
FIG. 7 is a flowchart for explaining the operation of an automatic transmission control apparatus according to Embodiment 2 of the present invention.

Next, an automatic transmission control apparatus according to Embodiment 2 of the present invention will be explained. FIG. 7 is a flowchart for explaining the operation of an automatic transmission control apparatus according to Embodiment 2 of the present invention; the operation of the voltage determination unit 117 is performed for each of the shift direction motor 105 and the selection direction motor 106. The automatic transmission control apparatus according to Embodiment 2 differs from the automatic transmission control apparatus according to Embodiment 1 in terms of the operation thereof based on the flowchart in FIG. 7.

In FIG. 7, firstly in the step S201, the target current It calculated in the transmission control unit 112 and the motor drive voltage Vm calculated in the drive duty calculation unit 114 are read; by utilizing the read target current It and motor drive voltage Vm, motor command power Wt required for changing transmission gears is calculated in accordance with the equation (1) below.

motor command power $Wt$=target current $It$×motor drive voltage $Vm$ (1)

Next, in the step S202, the motor current Ir detected by the motor current detection unit 116, the motor drive duty M_DUTY calculated by the drive duty calculation unit 114, and control apparatus voltage detection value Vbc detected by the control apparatus voltage detection unit 118 are read; by utilizing the read motor current Ir, motor drive duty M_DUTY, and control apparatus voltage detection value Vbc, motor actual power Wr, which is motor power when the motor voltage detection value Vbm is the same as the control apparatus voltage detection value Vbc, is calculated in accordance with the equation (2) below.

motor actual power $Wr$=motor current $Ir$×motor drive duty $M\_DUTY$×control apparatus voltage detection value $Vbc$ (2)

The reason why the control apparatus voltage detection value Vbc is utilized for calculating the motor actual power Wr is as follows:

Because the DC power source 120 supplies a voltage to the transmission control apparatus 110 and the motor control apparatus 115 in parallel, the same voltage is supplied to the transmission control apparatus 110 and the motor control apparatus 115. Accordingly, unless an abnormality exists in the motor voltage detection unit 119, the motor command power Wt is equal to the motor actual power Wr.

Next, in the step S203, motor voltage detection value Vbm is read; then, in the step S204, it is determined whether or not the difference between the motor command power Wt and the motor actual power Wr is the same as or larger than a predetermined determination power Wf. In the case where, in the step S204, the outcome of the determination is "Yes", i.e., in the case where the difference between the motor actual power Wr and the motor command power Wt is larger than the predetermined determination power Wf, the step S204 is followed by the step S205; in the case where, in the step S204, the outcome of the determination is "No", i.e., in the case where the difference between the motor actual power Wr and the motor command power Wt is smaller than the predetermined determination power Wf, the step S204 is followed by the step S211. The predetermined determination power Wf in the step S204 is set, for example, to 50 [W].

As can be seen from the equations (1) and (2), in the case where the difference between the motor actual power Wr and the motor command power Wt is larger than the predetermined determination power Wf, it is conceivable that the duty reference voltage Vb utilized for calculating the motor drive duty M_DUTY has changed. As far as the relationship between the motor command power Wt and the motor actual power Wr is concerned, in the case where no abnormality exists in the motor voltage detection unit 119, the motor drive duty M_DUTY is calculated based on the motor drive voltage Vm and the motor voltage detection value Vbm, and the motor voltage detection value Vbm is approximately equal to the control apparatus voltage detection value Vbc (Vbm≅Vbc); therefore, the motor command power Wt calculated in accordance with the equation (1) and the motor actual power Wr calculated in accordance with the equation (2) are approximately equal to each other. However, the fact that the difference between the motor command power Wt and the motor actual power Wr is the same as or larger than the predetermined determination power Wf suggests that the duty reference voltage Vb utilizes for calculating the motor drive duty M_DUTY, i.e., the motor voltage detection value Vbm has changes.

When the step S204 is followed by the step S211 after the outcome of the determination in the step S204 has become "No", it is determined whether or not the difference between the control apparatus voltage detection value Vbc and the motor voltage detection value Vbm, which are read in the steps S202 and S203, respectively, is the same as or smaller than a predetermined determination voltage value. In the case where the outcome of the determination in the step S211 is "Yes", i.e., in the case where the difference between the control apparatus voltage detection value Vbc and the motor voltage detection value Vbm is the same as or smaller than the predetermined determination voltage, the step S211 is followed by the step S212. In contrast, in the case where the outcome of the determination performed in the step S211 is "No", the step S211 is followed by the step S209, where the motor drive duty M_DUTY is calculated, and then the step S201 is resumed. The predetermined determination voltage in the step S211 is set, for example, to 1.0 [V].

In the case where the outcome of the determination in the step S211 is "Yes", i.e., in the case where the difference between the control apparatus voltage detection value Vbc and the motor voltage detection value Vbm is the same as or smaller than the predetermined determination voltage, the step S211 is followed by the step S212. In the step S212, it is determined whether or not the motor voltage detection abnormality flag is "1". In the case where an abnormality in the motor voltage detection unit 119 has become definite, the motor voltage detection abnormality flag becomes "1"; therefore, the outcome of the determination performed in the step S212 becomes "Yes", and then the step S212 is followed by the step S213.

In the case where no abnormality exists in the motor voltage detection unit 119, the motor voltage detection abnormality flag becomes "0"; therefore, the outcome of the determination in the step S212 becomes "No", and the step S212 is followed by the step S209, where the motor drive duty M_DUTY is calculated, and then the step S201 is resumed. In contrast, When the step S212 is followed by the step S213 after the outcome of the determination in the step S212 has become "Yes", the duty reference voltage Vb that is utilized for calculating the motor drive duty M_DUTY is changed from the control apparatus voltage detection value Vbc to the motor voltage detection value Vbm, and then the step S213 is followed by the step S214. In the step S214, the motor voltage detection abnormality flag is set to "0" and the voltage abnormality counter is reset; then, the step S214 is followed by the step S209, where the motor drive duty M_DUTY is calculated and then the step S201 is resumed.

In contrast, in the case where the outcome of the determination in the step S204 is "Yes", i.e., in the case where the difference between the motor actual power Wr and the motor command power Wt is larger than the predetermined determination power Wf, the step S204 is followed by the step S205, where it is determined whether or not the counter value of the voltage abnormality counter is the same as or greater than the predetermined determination time Tr. In the step S205, in the case where the counter value of the voltage abnormality counter is the same as or greater than a predetermined determination time Tr, the outcome of the determination becomes "No", and the step S205 is followed by the step S210, where the voltage abnormality counter is counted up; then, the step S210 is followed by the step S209, where the motor drive duty M_DUTY is calculated, and then the step S201 is resumed.

In the step S205, in case where the counter value of the voltage abnormality counter is greater than the predetermined determination time Tr, the outcome of the determination becomes "Yes"; however, in this case, it suggests that the difference between the motor command power Wt and the motor actual power Wr is larger than the predetermined determination power Wf and that condition has continued for a time period longer than the predetermined determination time Tr. The predetermined determination time Tr is set, for example, to 0.5 [sec].

Next, in the step S206, it is determined whether or not the motor voltage detection abnormality flag is "0". The fact that the step S205 is followed by the step S206 suggests that the difference between the motor command power Wt and the motor actual power Wr is larger than the predetermined determination power Wf and that condition has continued for a time period longer than the predetermined determination time Tr. The motor voltage detection abnormality flag, which is determined in the step S206, is set in the step S208 described later; in the case where an abnormality in the motor voltage detection unit 119 has become definite, the motor voltage detection abnormality flag becomes "1". Because, in the routine in which the step S205 is followed by the step S206 for the first time, the motor voltage detection abnormality flag is "0", the outcome of the determination is "Yes", and the step S206 is followed by the step S207.

After the determination performed in the step S206, when the motor voltage detection abnormality flag is "0", the outcome of the determination becomes "Yes"l, and the step S206 is followed by the step S207. In the step 207, the difference between the motor command power Wt and the motor actual power Wr is larger than the predetermined determination power Wf and that condition has continued for a time period longer than the predetermined determination time Tr; therefore, the voltage utilized as the duty reference voltage Vb by the drive duty calculation unit 114 is changed from the motor voltage detection value Vbm to the control apparatus voltage detection value Vbc.

The step S207 is followed by the step S208. As described above, in this situation, the difference between the motor command power Wt and the motor actual power Wr is larger than the predetermined determination power Wf, that condition has continued for a time period longer than the predetermined determination time Tr, and the voltage as the duty reference voltage Vb has been changed to the control apparatus voltage detection value Vbc; therefore, the motor voltage detection abnormality flag is set to "1", and the step S208 is followed by the step S209; after that, the motor drive duty M_DUTY is calculated, and then the step S201 is resumed.

After that, when the step S205 is followed by the step S206 in the second routine of the flowchart represented in FIG. 7 or thereafter, the motor voltage detection abnormality flag is "1", and the foregoing voltage as the duty reference voltage Vb has changed from the motor voltage detection value Vbm to the control apparatus voltage detection value Vbc; therefore, the outcome of the determination performed in the step S206 becomes "No", and then the step S206 is followed by the step S209, where the motor drive duty M_DUTY is calculated and then the step S201 is resumed.

Next, the automatic transmission control apparatus according to Embodiment 2 of the present invention will be explained with reference to a timing chart represented in FIG. 8. FIG. 8 is a timing chart representing the respective values in the automatic transmission control apparatus according to Embodiment 2 of the present invention, especially, a timing chart for a case where the motor is driven through the motor drive duty M_DUTY calculated by the drive duty calculation unit 114 in accordance with the transmission gear ratio corresponding to the command information CS from the transmission control unit 112; the chart (A) represents the motor voltage detection abnormality flag; the chart (B) represents the control apparatus voltage detection value Vbc, the motor voltage detection value Vbm, and the duty reference voltage Vb; the chart (C) represents the motor drive voltage Vm; the chart (D) represents the motor drive duty M_DUTY; the chart (E) represents the motor target current It and the motor current Ir; the chart (F) represents the motor command power Wt and the motor actual power Wr; the chart (G) represents the difference (Wr−Wt) between the motor actual power Wr and the motor command power Wt; and the chart (H) represents the voltage abnormality counter.

In FIG. 8, firstly, in the case where, in a time period from a time instant T1 to a time instant T2, the motor voltage detection value Vbm increases (refer to the chart (B)), the motor drive duty M_DUTY decreases in response to the increase (refer to the chart (D)); therefore, the motor power does not largely vary (refer to the charts (F) and (G)), whereby the controllability of the motor drive is not deteriorated; thus, the transmission mechanism 104 does not erroneously operate.

However, in the case where, in a time period after and including a time instant T3, the motor voltage detection value Vbm largely decreases (refer to the chart (B)), the motor drive duty M_DUTY decreases in response to the decrease (refer to the chart (D)), whereby the motor current Ir also increases (refer to the chart (E)). As a result, the difference between the motor actual power Wr and the motor command power Wt becomes large (refer to the charts (F) and (G)). After that, when the difference between the motor actual power Wr and the motor command power Wt exceeds the predetermined determination power Wf, the voltage abnormality counter starts to operate (refer to the charts (G) and (H)).

When, at a time instant T4, the duration of counting up by the voltage abnormality counter exceeds the predetermined determination time Tr (refer to the chart (H)), an abnormality in the motor voltage detection unit 119 becomes definite, and the voltage as the duty reference voltage Vb changes from the motor voltage detection value Vbm to the control apparatus voltage detection value Vbc (refer to the chart (B)); therefore, the motor drive duty M_DUTY decreases to a value that is the value thereof at a time instant when the abnormality in the motor voltage detection unit 119 has not become definite (refer to the chart (D)). The decrease in the motor drive duty M_DUTY causes the motor actual power Wr to decrease to a value that is nearly equal to the motor command power Wt, whereby the difference between the motor actual power Wr and the motor command power Wt becomes approximately zero (refer to the charts (F) and (G)).

Due to the operation in which the voltage as the duty reference voltage Vb is changed from the motor voltage detection value Vbm to the control apparatus voltage detection value Vbc (refer to the chart (B)), the motor drive duty M_DUTY decreases (refer to the chart (D)); therefore, the voltage applied to the motor is reduced, whereby the safety of the motor drive can be secured. Due to the reduction of the voltage applied to the motor, the motor current Ir is also reduced (refer to the chart (E)); thus, the controllability of the motor drive is prevented from being deteriorated, and the transmission mechanism 104 is not erroneously operated. An abnormality in the motor voltage detection unit 119 has become definite, and the voltage as the duty reference voltage Vb has been changed from the motor voltage detection value Vbm to the control apparatus voltage detection value Vbc (refer to the chart (B)); therefore, the motor voltage detection abnormality flag is set to "1" (refer to the chart (A)).

After that, when, at a time instant approximately immediately before the time instant T5, the motor voltage detection value Vbm returns from an abnormal condition with a low value thereof (refer to the chart (B)) and becomes a value approximately equal to the standard voltage, the difference (Vbm−Vbc) between the motor voltage detection value Vbm and the control apparatus voltage detection value Vbc becomes small; at the time instant T5 when the difference becomes the same as or smaller than the predetermined determination voltage, the duty reference voltage Vb utilized for calculating the motor drive duty M_DUTY is changed from the control apparatus voltage detection value Vbc to the motor voltage detection value Vbm (refer to the chart (B)).

Additionally, at the time instant T5, the motor voltage detection abnormality flag is changes from "1" to "0", and the voltage abnormality counter is reset (refer to the charts (A) and (H)). Even though the voltage as the duty reference voltage Vb utilized for calculating the motor drive duty M_DUTY is changed from the control apparatus voltage detection value Vbc to the motor voltage detection value Vbm, the difference between the motor voltage detection value Vbm and the control apparatus voltage detection value Vbc is negligibly small (refer to the chart (B)); thus, increase in the motor drive duty M_DUTY and increase in the motor actual power Wr are suppressed (refer to the charts (F) and (G)).

Moreover, because the motor drive duty M_DUTY is suppressed from increasing, the safety of the motor drive can be secured, and the controllability of the motor drive does not deteriorate. Because the controllability of the motor drive does not deteriorate, the transmission mechanism 104 is not erroneously operated. Still moreover, because the motor voltage detection value Vbm is utilized as the duty reference voltage Vb, the calculation of the motor drive duty M_DUTY can be performed based on the voltage supplied to the motor control apparatus 115; thus, the motor drive can accurately be performed, whereby the transmission mechanism 104 can precisely be controlled.

As described above, even in the case where an abnormality occurs in the motor voltage detection unit 119 and the motor voltage detection value Vbm decreases, the difference between the motor command power Wt and the motor actual power Wr is calculated and the difference is compared with the predetermined determination power Wf, so that the voltage as the duty reference voltage Vb utilized for calculating the motor drive duty M_DUTY is changed from the motor voltage detection value Vbm to the control apparatus voltage detection value Vbc; therefore, the suppression of increase in the motor drive duty M_DUTY as well as the detection of an abnormality in the motor voltage detection unit 119 are performed, whereby the voltage applied to the motor can be suppressed from increasing. Because increase in the voltage applied to the motor is suppressed, increase in the motor current can also be suppressed, whereby the safety of the motor can be secured. Moreover, the controllability of the motor drive is suppressed from being deteriorated. Still moreover, because the controllability of the motor drive can be suppressed from being deteriorated, the transmission mechanism 104 is not erroneously operated.

Furthermore, when the abnormality is eliminated from the motor voltage detection unit 119, the voltage as the duty reference voltage Vb that is utilized for calculating the motor drive duty M_DUTY in the drive duty calculation unit 114 is changed from the control apparatus voltage detection value Vbc to the motor voltage detection value Vbm; therefore, because the calculation of the motor drive duty M_DUTY and the drive of the motor can be performed based on the voltage supplied to the motor control apparatus 115, the safety of the motor can be secured, whereby high-accuracy motor drive can be performed without deteriorating the controllability of the motor drive; thus, the transmission mechanism 104 can accurately be controlled.

In the foregoing automatic transmission control apparatus according to Embodiment 2 of the present invention, even in the case where an abnormality occurs in the motor voltage detection unit 119 and the motor voltage detection value Vbm decreases, the motor command power Wt is calculated based on the target current It and the motor drive voltage Vm, the motor actual power Wr is calculated based on the motor drive duty M_DUTY, the control apparatus voltage detection value Vbc, and the motor current Ir, and the motor actual power Wr and the motor command power Wt are compared with each other, so that the voltage as the duty reference voltage Vb that is utilized for calculating the motor drive duty M_DUTY is changed from the motor voltage detection value Vbm to the control apparatus voltage detection value Vbc; therefore, the motor drive duty M_DUTY is suppressed from increasing, whereby the voltage applied to the motor can be suppressed from increasing. Because increase in the voltage applied to the motor can be suppressed, increase in the motor current can also be suppressed, whereby the safety of the motor can be secured; thus, the controllability of the motor drive is prevented from being deteriorated. Moreover, because the controllability of the motor drive can be suppressed from being deteriorated, the transmission mechanism 104 is not erroneously operated. Furthermore, an abnormality in the motor voltage detection unit 119 can be detected based on the method in which the voltage as the duty reference voltage Vb is changed from the motor voltage detection value Vbm to the control apparatus voltage detection value Vbc.

Moreover, when an abnormality in the motor voltage detection unit 119 is eliminated, the voltage as the duty reference voltage Vb that is utilized for calculating the motor drive duty M_DUTY in the drive duty calculation unit 114 is changed from the control apparatus voltage detection value Vbc to the motor voltage detection value Vbm; therefore, because the calculation of the motor drive duty M_DUTY can be performed based on the voltage supplied to the motor control apparatus 115, the motor drive can accurately be performed, whereby the transmission mechanism 104 can precisely be controlled.

Various modifications and alterations of this invention will be apparent to those skilled in the art without departing from the scope and spirit of this invention, and it should be understood that this is not limited to the illustrative embodiments set forth herein.

What is claimed is:

1. An automatic transmission control apparatus that changes transmission gear ratios of a transmission mechanism by use of a motor, the automatic transmission control apparatus comprising:
   a motor control apparatus that receives a voltage from a DC power source and controls the motor;
   a motor voltage detection unit that detects the voltage supplied to the motor control apparatus;
   a control apparatus voltage detection unit that detects a voltage supplied from the DC power source to the automatic transmission control apparatus;
   a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and
   a voltage determination unit that determines which one of a voltage detected by the control apparatus voltage detection unit and a voltage detected by the motor voltage detection unit is utilized as the duty reference voltage,
   wherein the motor control apparatus controls the motor, based on a motor drive duty that the drive duty calculation unit calculates by use of a voltage determined by the voltage determination unit.

2. An automatic transmission control apparatus that changes transmission gear ratios of a transmission mechanism by use of a motor, the automatic transmission control apparatus comprising:
   a motor control apparatus that receives a voltage from a DC power source and controls the motor;
   a motor voltage detection unit that detects the voltage supplied to the motor control apparatus;
   a control apparatus voltage detection unit that detects a voltage supplied from the DC power source to the automatic transmission control apparatus;
   a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and
   a voltage determination unit that determines which one of a voltage detected by the control apparatus voltage detection unit and a voltage detected by the motor voltage detection unit is utilized as the duty reference voltage,
   wherein the voltage determination unit is configured in such a way as to perform the determination, based on a difference between a voltage detected by the control apparatus voltage detection unit and a voltage detected by the motor voltage detection unit, and
   wherein the motor control apparatus controls the motor, based on a motor drive duty that the drive duty calculation unit calculates by use of a voltage determined by the voltage determination unit.

3. The automatic transmission control apparatus according to claim 2, wherein, in the case where the difference between a voltage detected by the control apparatus voltage detection unit and a voltage detected by the motor voltage detection unit is the same as or smaller than a predetermined determination voltage, the voltage determination unit determines in such a way as to utilize, as the duty reference voltage, the voltage detected by the motor voltage detection unit.

4. The automatic transmission control apparatus according to claim 2, wherein, in the case where, for a time period longer than a predetermined determination time, there has continued a condition under which the difference between a voltage detected by the control apparatus voltage detection unit and a voltage detected by the motor voltage detection unit is larger than the predetermined determination voltage, the voltage determination unit determines in such a way as to utilize, as the duty reference voltage, the voltage detected by the control apparatus voltage detection unit.

5. The automatic transmission control apparatus according to claim 4, wherein, in the case where the difference between a voltage detected by the control apparatus voltage detection unit and a voltage detected by the motor voltage detection unit is the same as or smaller than the predetermined determination voltage, the voltage determination unit changes a voltage to be utilized as the duty reference voltage from the voltage detected by the control apparatus voltage detection unit to the voltage detected by the motor voltage detection unit.

6. An automatic transmission control apparatus that changes transmission gear ratios of a transmission mechanism by use of a motor, the automatic transmission control apparatus comprising:
- a motor control apparatus that receives a voltage from a DC power source and controls the motor;
- a motor voltage detection unit that detects the voltage supplied to the motor control apparatus;
- a control apparatus voltage detection unit that detects a voltage supplied from the DC power source to the automatic transmission control apparatus;
- a drive duty calculation unit that calculates a motor drive voltage by utilizing a voltage, as a reference voltage, that is detected by the motor voltage detection unit, and calculates a motor drive duty, based on the calculated motor drive voltage and a duty reference voltage; and
- a voltage determination unit that determines which one of a voltage detected by the control apparatus voltage detection unit and a voltage detected by the motor voltage detection unit is utilized as the duty reference voltage, wherein the voltage determination unit is configured in such a way as to perform the determination, based on a difference between motor actual power consumed by the motor and motor command power for the motor, and wherein the motor control apparatus controls the motor, based on a motor drive duty that the drive duty calculation unit calculates by use of a voltage determined by the voltage determination unit.

7. The automatic transmission control apparatus according to claim 6, wherein, in the case where a difference between the motor actual power and the motor command power is the same as or smaller than a predetermined determination power and a difference between a voltage detected by the control apparatus voltage detection unit and a voltage detected by the motor voltage detection unit is the same as or smaller than a predetermined determination voltage, the voltage determination unit determines in such a way as to utilize, as the duty reference voltage, the voltage detected by the motor voltage detection unit.

8. The automatic transmission control apparatus according to claim 6, wherein, in the case where, for a time period longer than a predetermined determination time, there has continued a condition under which the difference between the motor actual power and the motor command power is larger than a predetermined determination power, the voltage determination unit determines in such a way as to utilize, as the duty reference voltage, the voltage detected by the control apparatus voltage detection unit.

9. The automatic transmission control apparatus according to claim 8, wherein, in the case where the difference between a voltage detected by the control apparatus voltage detection unit and a voltage detected by the motor voltage detection unit is the same as or smaller than the predetermined determination voltage, the voltage determination unit changes the voltage to be utilized as the duty reference voltage from the voltage detected by the control apparatus voltage detection unit to the voltage detected by the motor voltage detection unit.

* * * * *